(12) United States Patent
Vasseur et al.

(10) Patent No.: US 9,544,162 B2
(45) Date of Patent: Jan. 10, 2017

(54) LIGHTWEIGHT MULTICAST ACKNOWLEDGEMENT TECHNIQUE IN COMMUNICATION NETWORKS

(71) Applicant: Cisco Technology, Inc., San Jose, CA (US)

(72) Inventors: Jean-Philippe Vasseur, Saint Martin d'Uriage (FR); Sukrit Dasgupta, Norwood, MA (US); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 417 days.

(21) Appl. No.: 14/040,844

(22) Filed: Sep. 30, 2013

(65) Prior Publication Data

US 2015/0092529 A1   Apr. 2, 2015

(51) Int. Cl.
*H04L 12/18* (2006.01)
*H04L 1/18* (2006.01)
*H04L 1/00* (2006.01)

(52) U.S. Cl.
CPC ......... *H04L 12/1895* (2013.01); *H04L 1/1883* (2013.01); *H04L 1/1887* (2013.01); *H04L 12/1868* (2013.01); *H04L 2001/0093* (2013.01); *H04L 2001/0097* (2013.01)

(58) Field of Classification Search
CPC ..................... H04L 12/1895; H04L 1/1883
See application file for complete search history.

(56) References Cited

U.S. PATENT DOCUMENTS

| 7,184,421 | B1* | 2/2007 | Liu ........................ H04L 12/189 370/254 |
| 2004/0143672 | A1* | 7/2004 | Padmanabham . H04L 29/06027 709/231 |
| 2006/0114848 | A1* | 6/2006 | Eberle ................... H04L 1/1614 370/312 |
| 2008/0049620 | A1* | 2/2008 | Riga ...................... G01D 9/005 370/236 |

(Continued)

OTHER PUBLICATIONS

Adamson, et al., "NACK-Oriented R eliable Multicast (NORM) Transport Protocol", Network Working Group, Request for Comments 5740, Nov. 2009, 94 pages, The Internet Engineering Task Force Trust.

(Continued)

*Primary Examiner* — Dang Ton
*Assistant Examiner* — Kevin Lee
(74) *Attorney, Agent, or Firm* — Parker Ibrahim & Berg LLC; James M. Behmke; Stephen D. LeBarron

(57) ABSTRACT

In one embodiment, a message is received at a caching node in a network including an indication of the message's urgency. The message is transmitted to child nodes of the caching node, and upon transmitting the message, a retransmission timer is initiated when the message is urgent, based on the indication of the message's urgency. Then, one or more acknowledgements of receipt of the transmitted message are received from one or more of the child nodes, respectively. Upon expiration of the retransmission timer, when it is determined that one or more of the child nodes did not receive the transmitted message based on the received acknowledgements, the message is retransmitted to the child nodes.

25 Claims, 9 Drawing Sheets

(56) References Cited

U.S. PATENT DOCUMENTS

2012/0113986 A1* 5/2012 Shaffer ................ H04L 1/1854
 370/390
2014/0211652 A1* 7/2014 Shi ....................... H04W 36/18
 370/252

OTHER PUBLICATIONS

Daigle, et al., "RFC Streams, Headers, and Boilerplates", Internet Architecture Board, Request for Comments 5741, Dec. 2009, 16 pages, The Internet Engineering Task Force Trust.

Winter, et al., "RPL: IPv6 Routing Protocol for Low-Power and Lossy Networks", Request for Comments 6550, Mar. 2012, 157 pages, Internet Engineering Task Force Trust.

* cited by examiner

LIGHTWEIGHT MULTICAST ACKNOWLEDGEMENT TECHNIQUE IN COMMUNICATION NETWORKS

TECHNICAL FIELD

The present disclosure relates generally to computer networks, and, more particularly, to a lightweight multicast acknowledgement technique in communication networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. As LLN deployments are typically very large, e.g., containing hundreds of routers which manage millions of nodes, effectively managing network-wide configuration changes can present a challenge. Such network-wide changes include, for example, firmware migrations and configuration changes. In doing so, point-to-multipoint messaging may be utilized, which encompasses both large file upgrades handled by a centralized application, and short message transmissions sent by a server to a large set of nodes. Short message transmissions are helpful when urgent delivery of a message to a large set of nodes is required, e.g., in the case of rolling back a migration decision. Importantly, the inability to reliably propagate a short message through the network can impede the roll back and thus lead to major network disruption.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
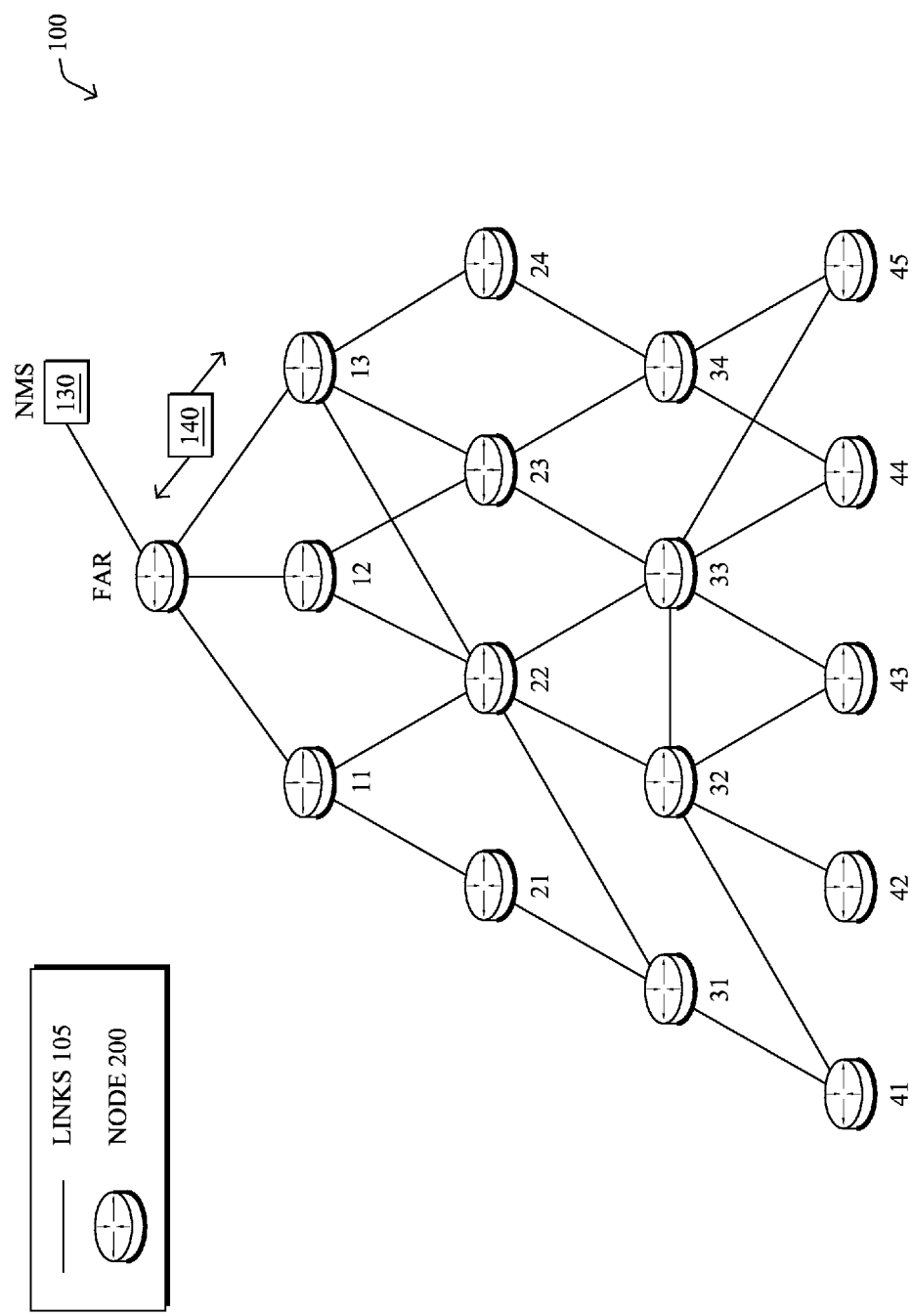
FIG. 1 illustrates an example communication network.

According to one or more embodiments of the disclosure, a message is received at a caching node in a network including an indication of the message's urgency. The message is transmitted to child nodes of the caching node, and upon transmitting the message, a retransmission timer is initiated when the message is urgent, based on the indication of the message's urgency. Then, one or more acknowledgements of receipt of the transmitted message are received from one or more of the child nodes, respectively. Upon expiration of the retransmission timer, when it is determined that one or more of the child nodes did not receive the transmitted message based on the received acknowledgements, the message is retransmitted to the child nodes.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "FAR," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure. A network management server (NMS) 130 may be in communication with the network 100, such as via a root node, e.g., a field area router (FAR), over a WAN or cellular network. For the purposes of the present disclosure, the NMS 130, FAR, or other centralized network device, may be considered a "central management node."

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
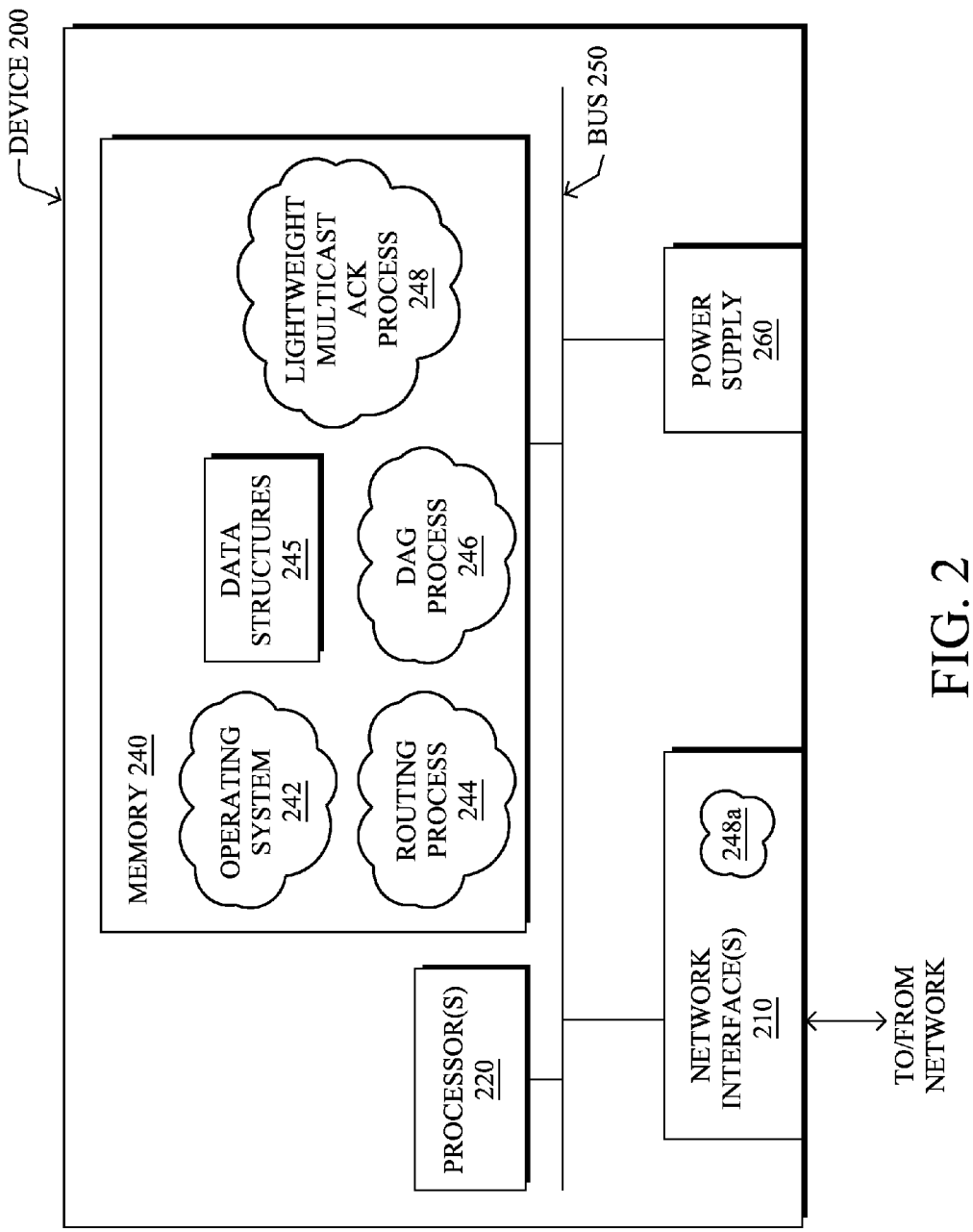
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative lightweight multicast acknowledgement ("lightweight multicast ack") process 248, as described herein. Note that while lightweight multicast acknowledgement process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by DAG process 246 and/or routing process 244) based on an Objective Function (OF). The role of the Objective Function is generally to specify rules on how to build the DAG (e.g. number of parents, backup parents, etc.).

Figure 3:
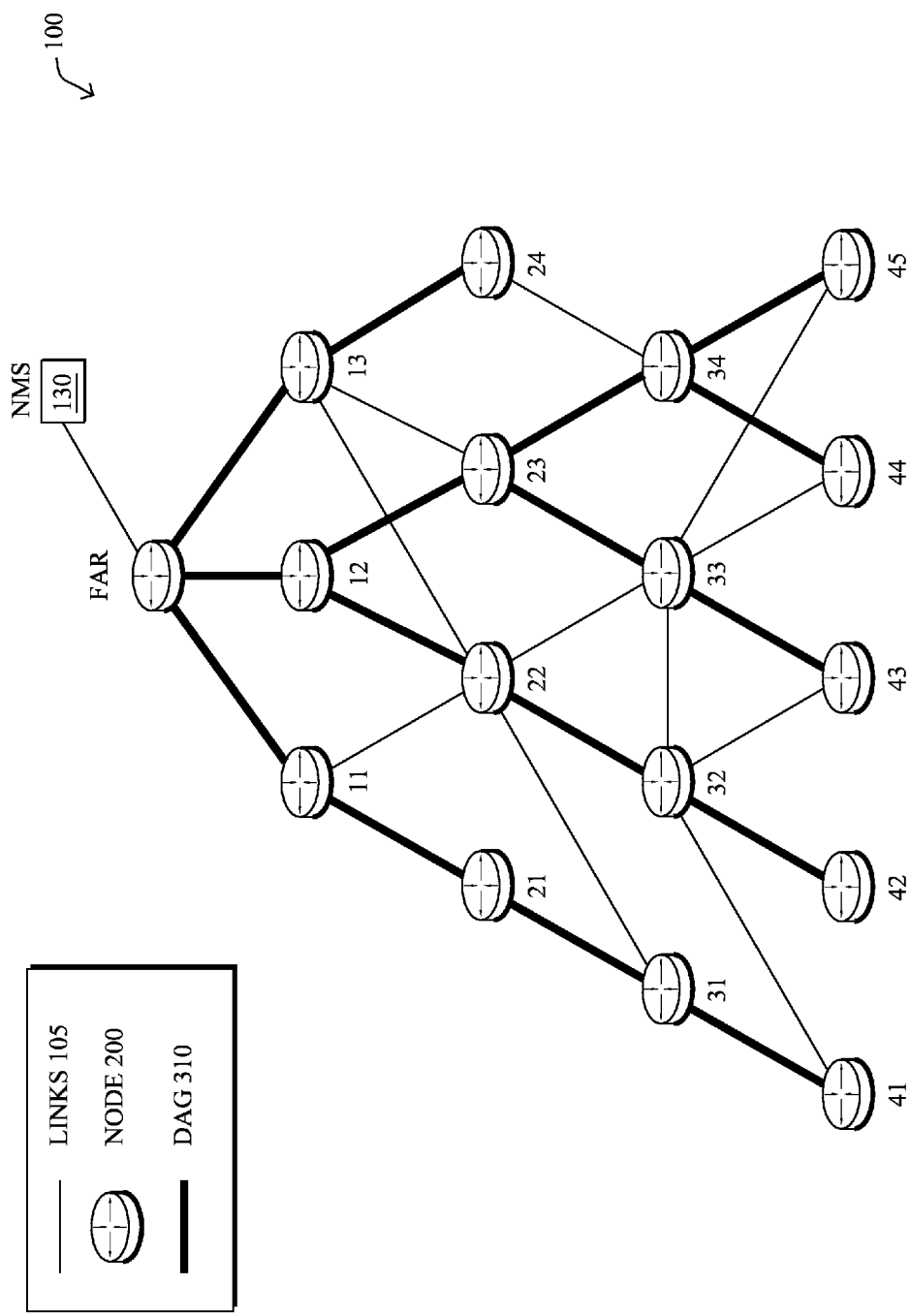
FIG. 3 illustrates an example simplified DAG that may be created within the example communication network.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node, e.g., FAR, toward one or more leaf nodes (nodes without children). Traffic/packets 140 (shown in FIG. 1) may then traverse the DAG 310 in either the upstream direction toward the FAR or downstream toward the leaf nodes, particularly as described herein.

As further noted above, there are multiple types of point-to-multipoint messaging in LLNs. The first type involves large file upgrades, e.g., downloading new firmware, configuration changes, etc., which may be handled by a centralized application, such as a network management server. In this case, retransmission of lost packets may be handled by the application itself. The application may use, for example, a bit-vector to record unsuccessful reception of file blocks, and may use unicast or multicast retransmission, based on the set of receivers requesting retransmission.

On the other hand, the second type involves "short messages" sent by a server to a large set of nodes. Short messages include, for example, an instruction to switch from an old to a newer version of a firmware, or an instruction to cancel a firmware migration once the new firmware/configuration has been pushed to a set of nodes, and a firmware switchover time has been set. Importantly, when an urgent delivery of a short message is required, doing so to a large set of nodes can be difficult. This is primarily due to the nature of LLN channels which leads to slow propagation of the information. As a result, some endpoints/nodes might switch to a new firmware/configuration, while others might not. As would be apparent to one of ordinary skill in the art, the inability to effectively enforce a firmware rollback can lead to major issues and network disruption.

Lightweight Multicast Acknowledgements

The techniques herein specify mechanisms for reliably delivering urgent short messages in constrained networks using local retransmission along the network topology. In contrast with current mechanisms, according to a disclosed embodiment, nodes relay a so-called "flagged message" and locally retransmit any lost messages to their children in a DAG, according to a dynamically computed timer and the level of urgency of the message. In another embodiment, the local retransmission is dynamically activated/de-activated according to a particular node's reliability of local delivery, urgency of the message, and resources available to the node. In addition, statistics are provided to a central engine, e.g., FAR, NMS, path computation element (PCE), or the like, in order to dynamically upload new policy rules for the particular node, and to decide where such a function should advantageously be activated in light of previous unsuccessful retransmissions.

Specifically, according to one or more embodiments of the disclosure as described in detail below, a message is received at a caching node in a network including an indication of the message's urgency. The message is transmitted to child nodes of the caching node, and upon transmitting the message, a retransmission timer is initiated when the message is urgent, based on the indication of the message's urgency. Then, one or more acknowledgements of receipt of the transmitted message are received from one or more of the child nodes, respectively. Upon expiration of the retransmission timer, when it is determined that one or more of the child nodes did not receive the transmitted message based on the received acknowledgements, the message is retransmitted to the child nodes.

Illustratively, the techniques described herein may be performed by hardware, software, and/or firmware, such as in accordance with the lightweight multicast acknowledgement process 248/248a, which may contain computer executable instructions executed by the processor 220 (or independent processor of interfaces 210) to perform functions relating to the techniques described herein. For example, the techniques herein may be treated as extensions to conventional communication protocols, and as such, may be processed by similar components understood in the art that execute those protocols, accordingly.

Operationally, a multi-step decision reinforcement mechanism is disclosed to increase the reliability of large-scale urgent short messages delivery in LLNs. In particular, in one embodiment, a network-wide message is delivered to a FAR, which then attempts to send the message to all the nodes as a multicast transmission. Second, nodes in the network—or more particularly, the DAG—keeps track of the nodes which are its children only, and then retransmits the message only to the children. This prevents flooding of the network channels, and ensures that the information propagates organically from one hop depth (e.g., "rank") to the next. Third, there are no explicit non-acknowledgements, e.g., "NACKs"; but rather, the absence of an acknowledgement, e.g., "ACK," is observed at the parents, and retransmission takes place only to the children from which ACKs were not received. Fourth, additional responsibilities may be assigned to specific nodes for caching information that needs to be retransmitted. The location of these nodes can be determined by exchanging retransmission-related statistics with the FAR. These additional responsibilities may be assigned based on information provided by the nodes via, e.g., a constrained application protocol (CoAP) simple management protocol (CSMP) message.

Figure 4:
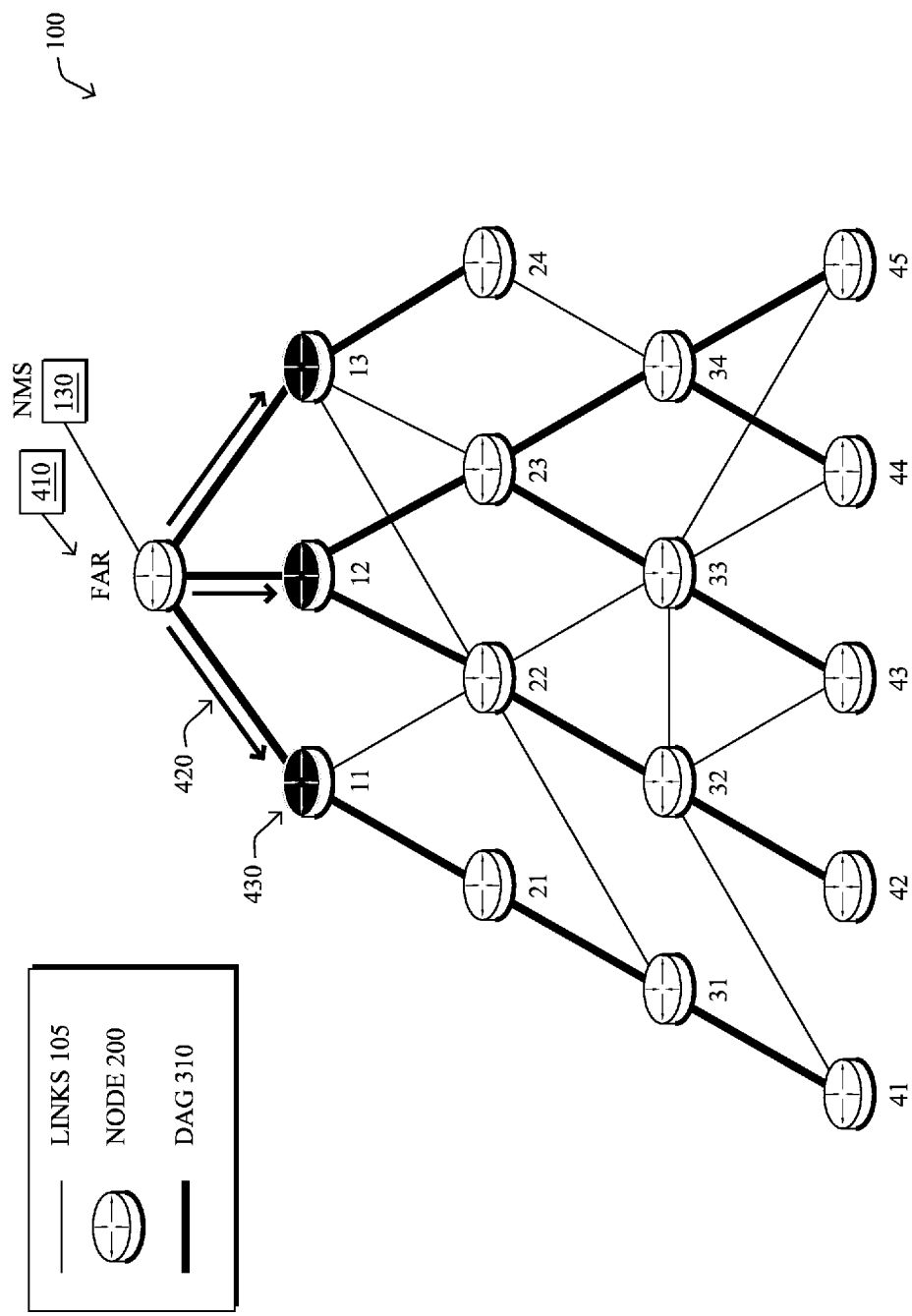
FIG. 4 illustrates an example communication network where a multicast communication is propagated from the FAR to the child nodes of the DAG.

FIG. 4 illustrates an example communication network where a multicast communication is propagated from the FAR toward the child nodes of the DAG. As shown in FIG. 4, the network 100 includes an urgent short message 410 which may be sent from a centralized management node, such as the NMS 130, to a FAR hosting a set of nodes, e.g., nodes 11-45. The FAR may then forward the urgent short message 410 toward the set of nodes to which the message must be successfully delivered.

For the purposes of the present disclosure, and as alluded to above, a message may be considered "urgent" when it is required that each and every node of the DAG receives the message, in order to avoid inconsistencies between nodes which could cause degradation of the overall network stability. For example, an urgent message may include rolling-back a migration decision, e.g., where a migration instruction has been sent from the FAR, but it is subsequently determined that the migration should no longer occur. If the urgent message, which contains the instruction to roll-back the migration, is not received by each and every node in the DAG, some nodes might switch to new firmware/configuration, while others might not, thereby causing instability throughout the network.

For example, in this case of a firmware migration, once the firmware has been pushed and a switchover time has been determined and configured on the endpoints, the FAR managing each DAG may be sent a final go/no-go status from the NMS 130. The final go/no-go status sent from the NMS may represent the short urgent delivery message 410 that must be reliably delivered to the nodes in the network 100.

Upon receiving the message 410, the FAR may transmit the message as a multicast communication 420 toward the other nodes in the DAG, which may be received by one or more receiving nodes 430. The multicast transmission 420 may be a multicast IPv6 packet, in which an IPv6 hop-by-hop header is included. In this regard, the multicast packet header may include a type-length-value (TLV) element comprising several fields, so as to relay various information to the nodes of the particular DAG/network.

For example, the header of multicast packet 420 may include a flag, e.g., the "Urgent Reliable Delivery" (URD) flag, to indicate that the particular message is urgent. If the URD flag in transmitted message 420 is set, i.e., the message is urgent, the techniques described herein may be triggered. Conversely, if the URD flag in the transmitted message 420 is not set, i.e., the message is not urgent, the message may be treated by the receiving nodes 430 in a normal manner. In addition to the URD flag, the multicast packet 420 may include a multi-bit (e.g., 3-bit) field, e.g., the "URG" field, that indicates a degree of urgency. Additionally, or alternatively, the multi-bit field may be used to report a time value for the delivery of the urgent message. Furthermore, a packet-number (PN) may be added to the message, e.g., in the form of a rolling counter carried within the URD flag. It should be understood that various other bit fields/flags may be inserted into the header of the multicast packet 420 to communicate important information relating to the urgent short message to the nodes of the particular DAG/network.

Figure 5:
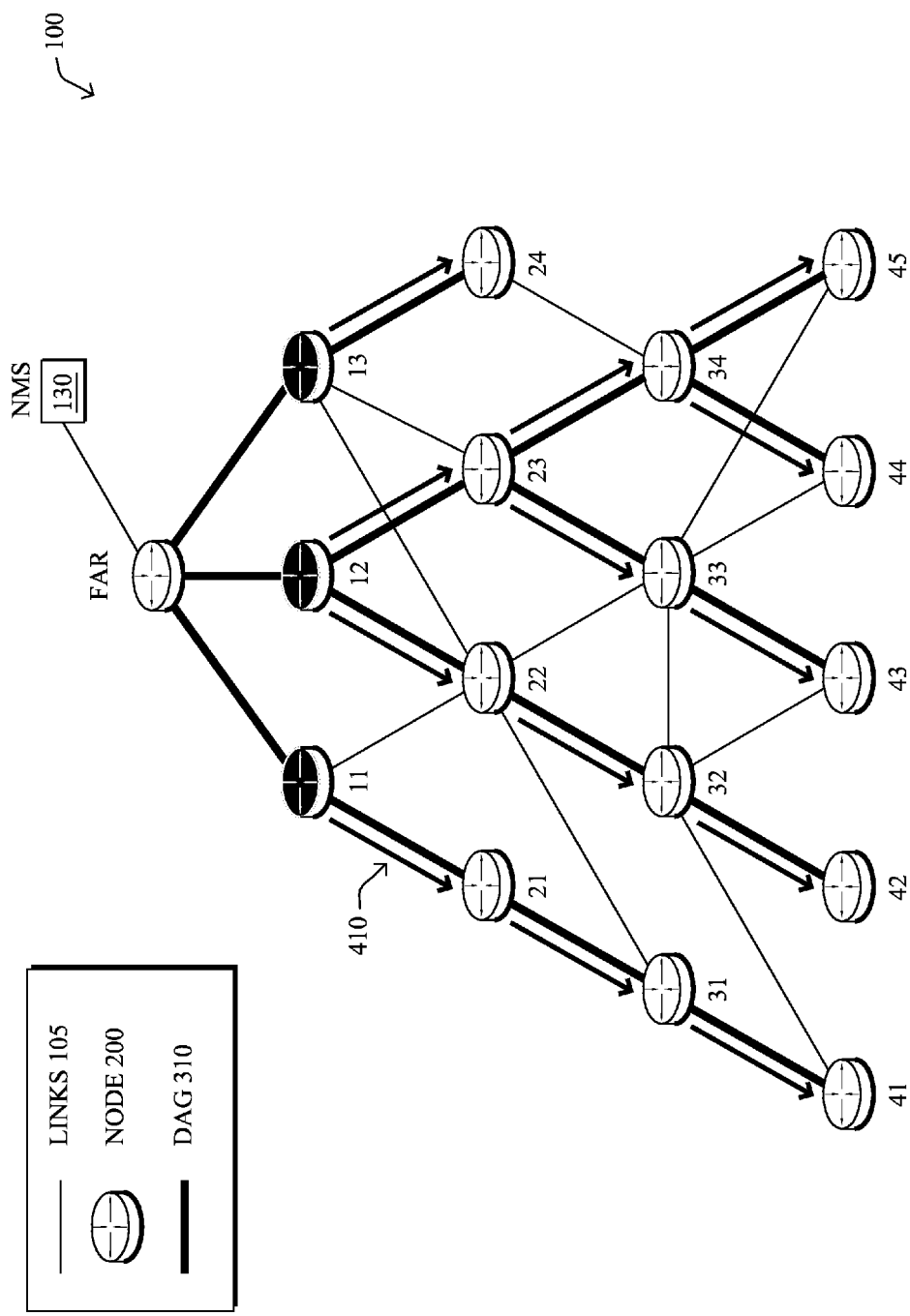
FIG. 5 illustrates an example communication network where an urgent short message is propagated through the network on a hop-by-hop basis.

FIG. 5 illustrates an example communication network where an urgent short message is propagated through the network 100 on a hop-by-hop basis. As shown in FIG. 5, the urgent short message 410 is forwarded from the receiving nodes 430 to their child node(s). Then, the child node(s) forward the urgent short message 410 to their child node(s), so as to propagate the urgent short message throughout the network 100. Upon receiving the message 410 at a given node, the received message may be passed to a local application hosted on the given node for data processing.

As described above, when an urgent short message is being delivered to nodes in a network, reliability is generally of utmost importance to ensure that each node has received the message. One technique of ensuring receipt of the urgent message is by tracking acknowledgements. As such, in the present disclosure, when a node receives a message with the URD flag set, i.e., the message is urgent, the node may send an acknowledgement, e.g., "ACK," for the received message, as described in further detail below.

Figure 6:
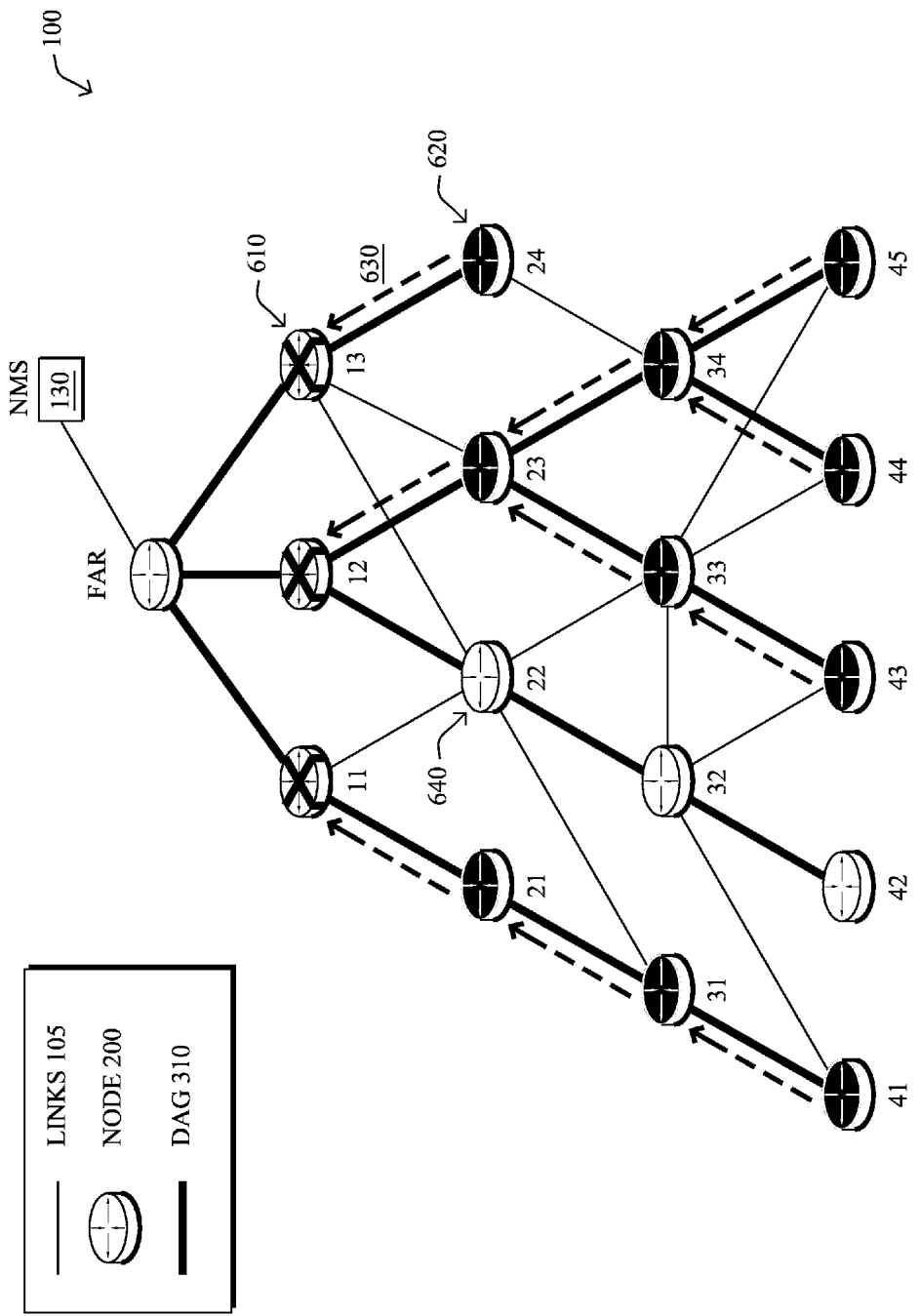
FIG. 6 illustrates an example communication network where nodes transmit acknowledgements of receipt of the urgent short message.

FIG. 6 illustrates an example communication network where nodes transmit acknowledgements of receipt of the urgent short message. As shown in FIG. 6, nodes 610 may be selected as "caching nodes," and the nodes 620 (designated by a darkened circle) have received the urgent short message from the caching nodes and transmitted an acknowledgement of receipt 630 to the caching nodes. The caching nodes are designated to retransmit non-acknowledged messages to child nodes of the caching node. Illustratively, the caching nodes 610 may be configured to monitor the acknowledgements 630 received from the child nodes 620, and retransmit the urgent short messages to the child nodes 640, from which no acknowledgement was received. Notably, particular nodes in the network 100, e.g., nodes 11-13 (or any other node at any distance from the root), may be specifically selected as the caching nodes 610. In the alternative, each node in the network 100 may act as a local caching node capable of locally retransmitting the urgent short message.

Upon receiving an urgent short message 410, the nodes 620 may send an acknowledgement 630 to the caching node 610, from which the urgent short message was received. Alternatively, the acknowledgement 630 may be sent to the parent node of the recipient node 620, and the acknowledgement may be propagated upwardly through the DAG to the caching node 610. The acknowledgement 630 may include the packet number of the received message, the packet number being contained in the header of the packet.

At the caching nodes 610, a retransmission timer $T_{loc}$ may be initiated after transmitting the urgent message 410, and the caching nodes may wait for the reception of acknowledgements from the child node(s). Then, the caching nodes 610 may determine that one or more of the child nodes did not receive the transmitted message 410 based on the received acknowledgements 630. To do so, the caching nodes 610 may monitor the sum of received acknowledgements 630, and determine whether the sum of received acknowledgements is equal to the sum of the child nodes. Moreover, the caching nodes 610 may monitor the received acknowledgements 630 using a bit vector-type data structure. For example, the bit vector-type structure may contain a bit field for each child node of the particular caching node 610. The bit vector may be initiated by setting each bit to '0'. However, a bit may be flipped to '1' in the case that an acknowledgement 630 is received from a child node 620. In this case, the bit in the position corresponding to the acknowledging child node 620 may be flipped to '1'.

When the sum of received acknowledgements 630 is equal to the sum of the child nodes, the caching nodes 610 may determine that all of the child nodes have received the urgent short message. Therefore, if after the expiration of the timer $T_{loc}$, N ACK messages 630 have been received at the caching nodes 610, whereby N is equal to the sum of the child nodes, the message may simply be discarded. On the other hand, if after the expiration of the timer $T_{loc}$, less than N ACK messages 630 have been received at the caching nodes 610, the caching nodes may locally retransmit the urgent short message. This way, overall reliability may be increased by retransmitting the urgent message to the child nodes from which an acknowledgement 630 has not been received, e.g., nodes 640.

The local retransmission timer $T_{loc}$ may be dynamically adjusted by each caching node 610 according to a multitude of factors. For example, the caching nodes 610 may calculate the known transmission time of the link and dynamically adjust the timer accordingly. Also, the caching nodes 610 may calculate the average urgent message acknowledgement time Ave(ACK) of its child nodes, multiplied by a factor K, where K may be a function of the URG field, which, if present, may be carried in the multicast packet header. In other words, the retransmission timer $T_{loc}$ may be adjusted according to the following formula:

$$T_{loc} = f(URG) * Ave(ACK) \quad (1)$$

The dynamic adjustment of the local retransmission timer $T_{loc}$ may further be based on the sum of the child nodes and a policy established by a central management node. Notably, the ability to dynamically adjust the retransmission timer $T_{loc}$ maintained by the caching nodes 610 allows for the network 100 to remain agile and efficient, while reliably delivering urgent short messages.

Figure 7:
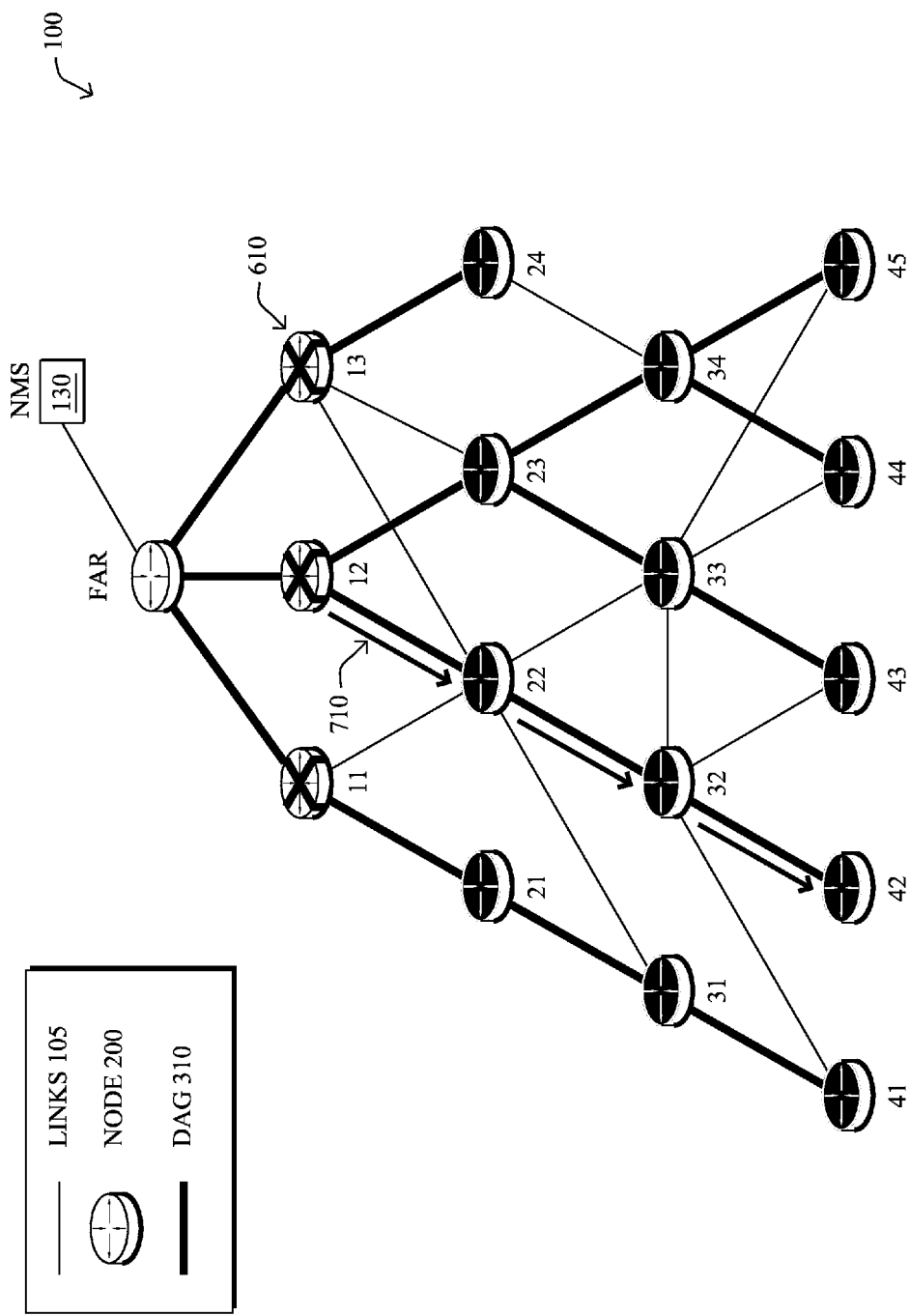
FIG. 7 illustrates an example communication network where the caching nodes locally retransmit the urgent short message.

FIG. 7 illustrates an example communication network where the caching nodes locally retransmit the urgent short message. As shown in FIG. 7, the network 100 includes caching nodes 610 which retransmit the urgent short message 710 to the nodes 640, from which an acknowledgement 630 was not received (illustrated in FIG. 6).

Because in FIG. 6, a sum of the received acknowledgements 630 is less than a sum of the child nodes of the caching nodes 610, the caching nodes retransmit the urgent short message 710 to the child nodes. It should be noted that the sum of the child nodes of the caching nodes 610 may include a sum of all descendant nodes—not necessarily the direct descendants, i.e., "children"—of the caching nodes. This way, the message 710 is forwarded along the DAG using local retransmissions in case of packet loss. Eventually, every child node receives the urgent short message—as illustrated in FIG. 7—such that the overall reliability of the short message delivery is dramatically increased.

With respect to the caching nodes 610 illustrated in FIGS. 6 and 7, those nodes may be intelligently selected to act as a caching node, as opposed to having all nodes acting as a caching node. Furthermore, the caching function of the caching nodes 610 may be dynamically activated during the urgent short message delivery process, thereby activating, and de-activating, the caching functionality of a given node when necessary in the DAG. This dynamic selection and activation of the caching functionality is important in order to prevent each node from caching received messages when not needed, thus reducing the burden of caching packets. These capabilities also prevent a node from staying awake for retransmission purposes, when there is no need to (an especially important consideration for battery-operated devices).

In this regard, a 1-bit caching node flag, e.g., the "C-bit," may be carried in the utilized routing protocol. The C-bit may be used to represent a node's capability to operate as a caching node. For example, if RPL is the protocol being utilized in an LLN, the C-bit may be inserted in a DODAG Information Object (DIO) message used to build the DAG. When set, this may indicate to the child nodes that the node from which the DIO message was received is a caching node. It should be understood that a DIO message is a type of DAG discovery message that carries information that allows a node to discover a RPL Instance, learn its configuration parameters, select a DODAG parent set, and maintain the upward routing topology. Generally, the DIO message is transmitted from the root device(s) of the DAG, e.g., the FAR, downward toward the leaves, informing each successive receiving device how to reach the root device (that is, from where the request is received is generally the direction of the root).

Upon receiving the DIO, a node may generate its own DIO, overriding the caching node flag, if needed, should it not act as a caching node and vice versa. At this point, each node can begin gathering local statistics to help in deciding whether to clear the C-bit in its own DIO, thus disabling the caching function locally. For instance, a particular node may compute the number of times it acted as a caching node (e.g., retransmitting a non-acknowledged urgent message to one of its children), the number of retransmissions for at least one children for the past X urgent messages delivered, etc.

A node may also decide to reactivate the caching function if it receives an urgent message with the URG field set to HIGH, or with a very small value for the delivery of the message. In this case, the node may set the caching node flag and trigger a DIO update. In addition, other local policies may be used for determining whether to activate/deactivate the caching function at a particular node. For example, a node may examine available computing resources, including, available memory, CPU cycles, or energy. Furthermore, if a node detects that its parent cannot operate as a caching node, retransmission of an urgent message may be requested of the FAR, a local application, or the node's grand-parent node (if known).

Figure 8:
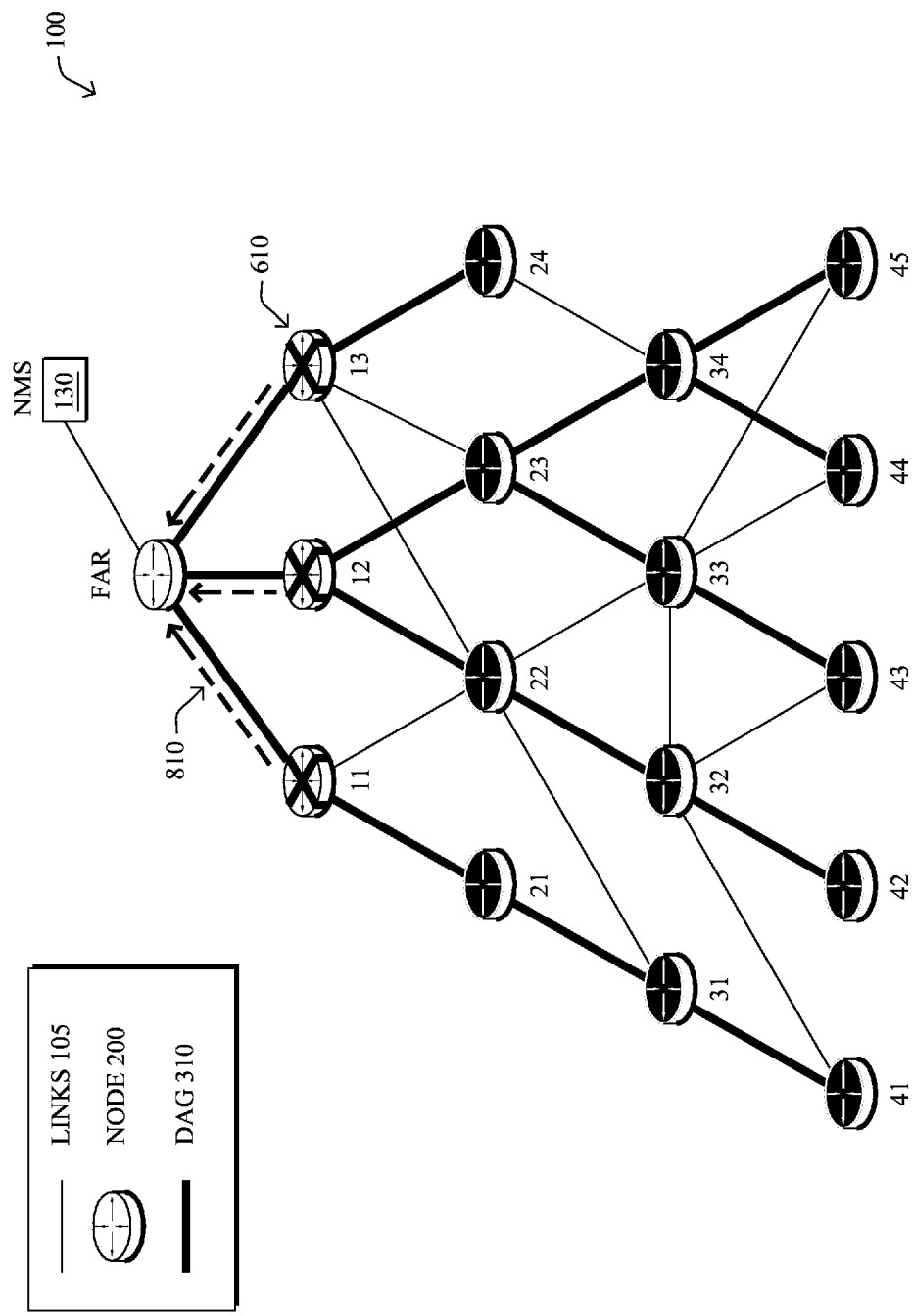
FIG. 8 illustrates an example communication network where the caching nodes report retransmission statistics to a centralized management node.

FIG. 8 illustrates an example communication network where the caching nodes report retransmission statistics to a centralized management node. As shown in FIG. 8, the network 100 includes caching nodes 610 sending reporting messages 810 to a centralized management node, such as the FAR.

A reporting message, e.g., CoAP message, may be sent by each node involved in the short message retransmission techniques described herein to the FAR and/or the NMS 130, in order to report statistics relating to retransmission. For example, the statistics available for reporting may include an observed retransmission frequency/time, a number of times selected as the caching node, a number of times a node switches between a caching and non-caching node, and the like.

Such statistics may advantageously be used by the FAR, the NMS 130, or other analytics tools to determine the effectiveness of the overall mechanism, as well as potentially uploading a new caching-related policy rule for each node in the network. For example, upon receiving the reported statistics, the NMS 130 may determine that a particular node in the network 100 should always be acting as a caching node, considering its strategic place in the network. However, that particular node, according to the statistics, tends to disable the caching function too often. Thus, the NMS 130 may upload a new policy requiring the particular node to act as a caching node indefinitely. The statistics may even be used by a central engine to recompute a new topology and increase the level of reliability for the delivery of an urgent message.

Figure 9:
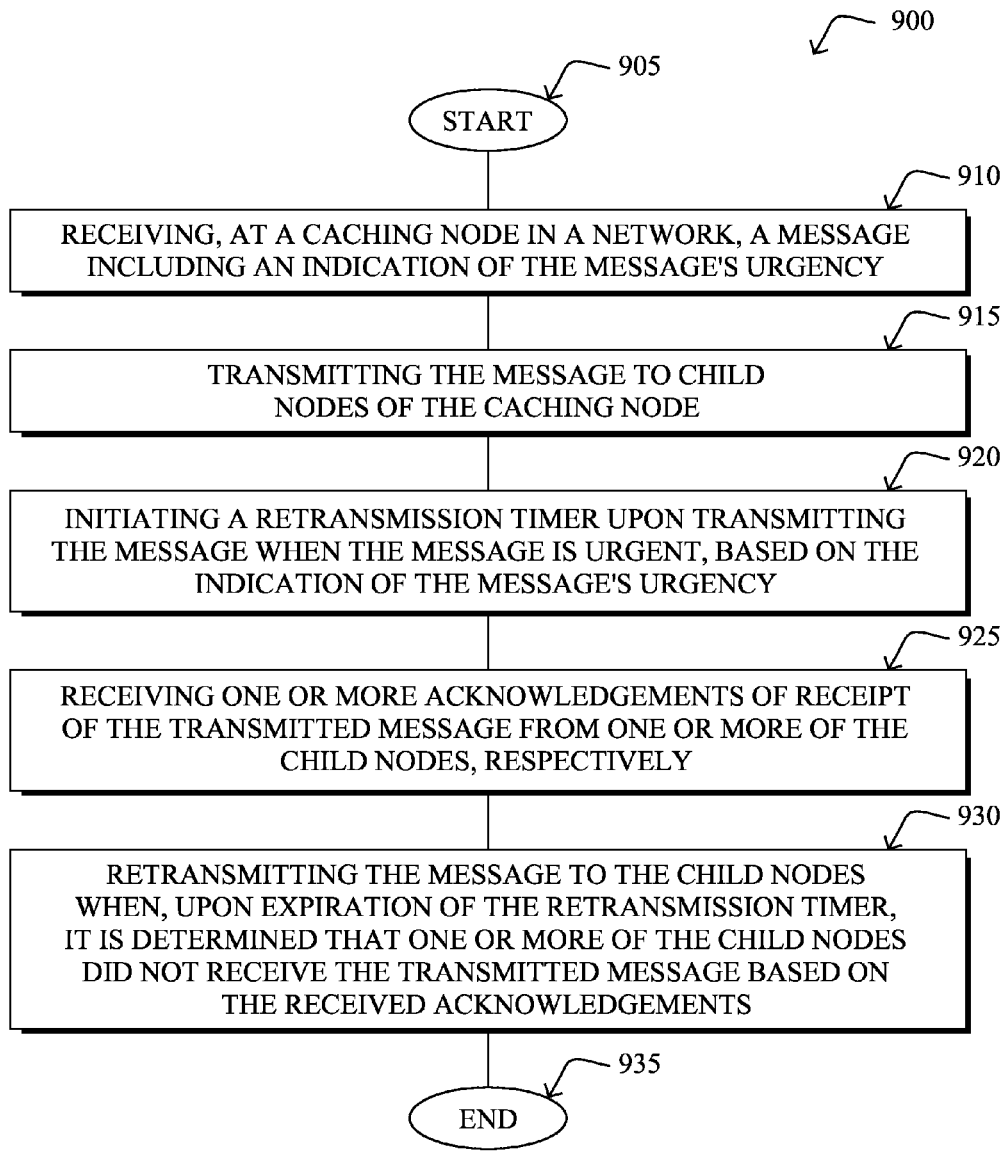
FIG. 9 illustrates an example simplified procedure for lightweight multicast acknowledgements.

FIG. 9 illustrates an example simplified procedure 900 for lightweight multicast acknowledgements. As shown in FIG. 9, the procedure 900 may start at step 905, continue to step 910, and so forth, where, as described in greater detail above, an urgent short message may be locally retransmitted to nodes in a DAG in the case of packet loss.

Specifically, at Step 910, a message may be received at a caching node in a network including an indication of the message's urgency. At Step 915, the message may be transmitted to child nodes of the caching node. At Step 920, upon transmitting the message, a retransmission timer may be initiated when the message is urgent, based on the indication of the message's urgency. Then, at Step 925, one or more acknowledgements of receipt of the transmitted message may be received from one or more of the child nodes, respectively. Finally, at Step 930, upon expiration of the retransmission timer, when it is determined that one or more of the child nodes did not receive the transmitted message based on the received acknowledgements, the message may be retransmitted to the child nodes. The procedure 900 may illustratively end at Step 935. The techniques by which the steps of procedure 900 may be performed, as well as ancillary procedures and parameters, are described in detail above.

It should be understood that the steps shown in FIG. 9 are merely examples for illustration, and certain steps may be included or excluded as desired. Further, while a particular order of the steps is shown, this ordering is merely illustrative, and any suitable arrangement of the steps may be utilized without departing from the scope of the embodiments herein.

The techniques described herein, therefore, confer multiple advantages for a network in which reliably delivering urgent short messages is required. For instance, the disclosed embodiments prevent programmed network-wide events from happening when circumstances suddenly change and the programmed event needs to be recalled. Further, the embodiments allow all endpoints in the network to have a complete knowledge of the state before any wide-scale events are undertaken. Even further, the embodiments introduce robustness in a large scale network by increasing reliability of network-wide message delivery and removing inconsistencies.

While there have been shown and described illustrative embodiments that provide for lightweight multicast acknowledgements, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks and/or protocols. Additionally, the embodiments have been shown as described primarily with relation to RPL and DAG-forming control messages, e.g., DIO/DAO messages. However, it should be understood that the disclosed embodiments are not limited thereto, and may be applicable to other types of protocols and data messages.

Moreover, the foregoing description has been directed to specific embodiments. It will be apparent, however, that other variations and modifications may be made to the described embodiments, with the attainment of some or all of their advantages. or instance, it is expressly contemplated that the components and/or elements described herein can be implemented as an apparatus that comprises at least one network interface that communicates with a network, e.g., an LLN, a processor coupled to the at least one network interface, and a memory configured to store program instructions executable by the processor. Further, it is expressly contemplated that the components and/or elements described herein can be implemented as software being stored on a tangible, non-transitory computer-readable medium (e.g., disks/CDs/RAM/EEPROM/etc.) having program instructions executable by a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a caching node in a network, a message including an indication of the message's urgency;
   transmitting, by the caching node, the message to child nodes of the caching node;
   in response to the message including an indication that the message is urgent:
      initiating, by the caching node, a retransmission timer upon transmitting the message when the message is urgent, based on the indication of the message's urgency;
      caching the message at the caching node;
      receiving, at the caching node, one or more acknowledgements of receipt of the transmitted message from one or more of the child nodes, respectively;
      monitoring, by the caching node, received acknowledgements using a bit vector-type data structure; and
      retransmitting, by the caching node, the cached message to the child nodes when, upon expiration of the retransmission timer, determination is made that one or more of the child nodes did not receive the transmitted message based on the monitored received acknowledgements.

2. The method according to claim 1, wherein a particular node in the network is dynamically selected amongst nodes in the network to act as the caching node, which is designated to retransmit non-acknowledged messages to child nodes of the caching node.

3. The method according to claim 2, wherein the particular node is dynamically selected to act as the caching node based on one or more of: a rate of retransmission of the message, the sum of the child nodes, an amount of urgent messages received, computing resources available to the particular node, and a topology of the network.

4. The method according to claim 2, wherein the particular node is dynamically selected to act as the caching node by the particular node itself.

5. The method according to claim 2, wherein the particular node is dynamically selected to act as the caching node by a central management node.

6. The method according to claim 1, further comprising:
   sending a message to a child node of the caching node including an indication that the caching node is selected to act as the caching node.

7. The method according to claim 1, further comprising:
   dynamically adjusting a duration of the retransmission timer based on one or more of: the sum of the child nodes, a transmission time of a communication link used by the caching node, an average acknowledgement time of the child nodes, the indication of the message's urgency, a product of a function of the average acknowledgement time of the child nodes and a function of the indication of the message's urgency, and a policy established by a central management node.

8. The method according to claim 1, further comprising: sending a reporting message to a central management node reporting statistics relating to the retransmitting of the message to the child nodes.

9. The method according to claim 8, wherein the statistics include one or more of:
retransmission frequency, retransmission time, a number of times selected as the caching node, and a number of times switched between a caching node and a non-caching node.

10. The method according to claim 1, wherein it is determined that one or more of the child nodes did not receive the transmitted message when a sum of the received acknowledgements is less than a sum of the child nodes.

11. The method according to claim 1, wherein it is determined that one or more of the child nodes did not receive the transmitted message using a bit vector-type data structure to track the received acknowledgements.

12. The method according to claim 1, wherein a packet header of the transmitted message includes an indication of one or more of: whether the transmitted message is urgent, a degree of urgency of the transmitted message, a sequential value of the transmitted message, and a time value for the transmission of the transmitted message.

13. An apparatus, comprising:
one or more network interfaces that communicate with a network;
a processor coupled to the one or more network interfaces and configured to execute a process; and
a memory configured to store program instructions which contain the process executable by the processor, the process comprising:
receiving, as a caching node in the network, a message including an indication of the message's urgency;
transmitting the message to child nodes of the caching node;
in response to the message including an indication that the message is urgent:
initiating a retransmission timer upon transmitting the message when the message is urgent, based on the indication of the message's urgency;
caching the message at the caching node;
receiving one or more acknowledgements of receipt of the transmitted message from one or more of the child nodes, respectively;
monitoring received acknowledgements using a bit vector-type data structure and
retransmitting the cached message to the child nodes when, upon expiration of the retransmission timer, it is determined that one or more of the child nodes did not receive the transmitted message based on the monitored received acknowledgements.

14. The apparatus according to claim 13, wherein the apparatus is dynamically selected amongst nodes in the network to act as the caching node, which is designated to retransmit non-acknowledged messages to child nodes of the caching node.

15. The apparatus according to claim 14, wherein the apparatus is selected to act as the caching node based on one or more of: a rate of retransmission of the message, the sum of the child nodes, an amount of urgent messages received, computing resources available to the particular node, and a topology of the network.

16. The apparatus according to claim 14, wherein the apparatus is dynamically selected to act as the caching node by the apparatus itself.

17. The apparatus according to claim 14, wherein the apparatus is dynamically selected to act as the caching node by a central management node.

18. The apparatus according to claim 13, further comprising:
sending a message to a child node of the apparatus including an indication that the apparatus is selected to act as the caching node.

19. The apparatus according to claim 13, further comprising:
dynamically adjusting a duration of the retransmission timer based on one or more of: the sum of the child nodes, a transmission time of a communication link used by the caching node, an average acknowledgement time of the child nodes, the indication of the message's urgency, a product of a function of the average acknowledgement time of the child nodes and a function of the indication of the message's urgency, and a policy established by a central management node.

20. The apparatus according to claim 13, further comprising:
sending a reporting message to a central management node reporting statistics relating to the retransmitting of the message to the child nodes.

21. The apparatus according to claim 20, wherein the statistics include one or more of:
retransmission frequency, retransmission time, a number of times selected as the caching node, and a number of times switched between a caching node and a non-caching node.

22. The apparatus according to claim 13, wherein it is determined that one or more of the child nodes did not receive the transmitted message when a sum of the received acknowledgements is less than a sum of the child nodes.

23. The apparatus according to claim 13, wherein it is determined that one or more of the child nodes did not receive the transmitted message using a bit vector-type data structure to track the received acknowledgements.

24. The apparatus according to claim 13, wherein a packet header of the transmitted message includes an indication of one or more of: whether the transmitted message is urgent, a degree of urgency of the transmitted message, a sequential value of the transmitted message, and a time value for the transmission of the transmitted message.

25. A tangible non-transitory computer readable medium storing program instructions that cause a computer to execute a process, the process comprising:
receiving, at a caching node in a network, a message including an indication of the message's urgency;
transmitting the message to child nodes of the caching node;
in response to the message including an indication that the message is urgent:
initiating a retransmission timer upon transmitting the message when the message is urgent, based on the indication of the message's urgency;
caching the message at the caching node;
receiving one or more acknowledgements of receipt of the transmitted message from one or more of the child nodes, respectively;
monitoring received acknowledgements using a bit vector-type data structure; and
retransmitting the cached message to the child nodes when, upon expiration of the retransmission timer, it is determined that one or more of the child nodes did not receive the transmitted message based on the monitored received acknowledgements.

\* \* \* \* \*